(12) United States Patent
Pawar et al.

(10) Patent No.: US 11,310,016 B2
(45) Date of Patent: Apr. 19, 2022

(54) SOUNDING REFERENCE SIGNAL SEQUENCE DESIGN

(71) Applicant: Apple Inc., Cupertino, CA (US)

(72) Inventors: Sameer Pawar, Santa Clara, CA (US); Alexei Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 16/612,333

(22) PCT Filed: Jun. 12, 2018

(86) PCT No.: PCT/US2018/037155
§ 371 (c)(1),
(2) Date: Nov. 8, 2019

(87) PCT Pub. No.: WO2018/231867
PCT Pub. Date: Dec. 20, 2018

(65) Prior Publication Data
US 2020/0177342 A1 Jun. 4, 2020

Related U.S. Application Data

(60) Provisional application No. 62/518,488, filed on Jun. 12, 2017, provisional application No. 62/544,628, (Continued)

(51) Int. Cl.
*H04L 5/00* (2006.01)
*H04W 72/04* (2009.01)

(52) U.S. Cl.
CPC .......... *H04L 5/0053* (2013.01); *H04L 5/0007* (2013.01); *H04L 5/0037* (2013.01);
(Continued)

(58) Field of Classification Search
CPC ... H04L 5/0053; H04L 5/0007; H04L 5/0037; H04L 5/0051; H04L 5/0091; H04W 72/0413; H04W 72/042
See application file for complete search history.

(56) References Cited

U.S. PATENT DOCUMENTS

2014/0211736 A1* 7/2014 Noh .................. H04W 56/0005
370/329
2017/0033908 A1* 2/2017 Hwang ................ H04L 5/0053
(Continued)

FOREIGN PATENT DOCUMENTS

JP 2010178129 A 8/2010

OTHER PUBLICATIONS

International Search Report and Written Opinion for PCT Application No. PCT/US18/37155 dated Oct. 29, 2018.
(Continued)

*Primary Examiner* — Duc C Ho
(74) *Attorney, Agent, or Firm* — Sterne, Kessler, Goldstein & Fox P.L.L.C.

(57) ABSTRACT

Described is an apparatus of an Evolved Node-B (eNB). The apparatus may comprise a first circuitry and a second circuitry. The first circuitry may be operable to determine a first Sounding Reference Signal (SRS) sequence and a second SRS sequence. The second circuitry may be operable to process a first Uplink (UL) transmission from the first UE incorporating the first SRS sequence over a first set of subcarrier frequencies. The second circuitry may also be operable to process a second UL transmission from the second UE incorporating the second SRS sequence over a second set of subcarrier frequencies. The second SRS sequence may comprise at least a first block that overlaps the first set of subcarrier frequencies and a second block that does not overlap the first set of subcarrier frequencies.

24 Claims, 10 Drawing Sheets

Related U.S. Application Data filed on Aug. 11, 2017, provisional application No. 62/567,179, filed on Oct. 2, 2017, provisional application No. 62/570,006, filed on Oct. 9, 2017, provisional application No. 62/588,078, filed on Nov. 17, 2017.

(52) U.S. Cl.
CPC .......... *H04L 5/0051* (2013.01); *H04L 5/0091* (2013.01); *H04W 72/042* (2013.01); *H04W 72/0413* (2013.01)

(56) References Cited

U.S. PATENT DOCUMENTS

| | | | | |
|---|---|---|---|---|
| 2017/0366377 | A1* | 12/2017 | Papasakellariou | H04L 5/005 |
| 2018/0278450 | A1* | 9/2018 | Zarifi | H04L 27/2613 |
| 2018/0279229 | A1* | 9/2018 | Dinan | H04W 52/367 |

OTHER PUBLICATIONS

3GPP, "RAN1 Chairman's Notes", 3GPP TSG RAN WG1 Meeting #88, Athens, Greece, Feb. 13-17, 2017.
3GPP, "RAN1 Chairman's Notes", 3GPP TSG RAN WG1 Meeting #88bis, Spokane, WA, USA, Apr. 3-7, 2017.
3GPP, "RAN1 Chairman's Notes", 3GPP TSG RAN WG1 Meeting #89, Hangzhou, P.R. China, May 15-19, 2017.
3GPP,"RAN1 Chairman's Notes", 3GPP TSG RAN WG1 Meeting #90, Prague, CR, Aug. 21-25, 2017.
3GPP, "RAN1 Chairman's Notes", 3GPP TSG RAN WG1 Meeting NR #3, Nagoya, Japan, Sep. 18-21, 2017.
3GPP, "RAN1 Chairman's Notes", 3GPP TSG RAN WG1 NR Ad-Hoc #2, Qingdao, P.R. China, Jun. 27-30, 2017.
Intel Corp., "Discussion on SRS for NR", 3GPP Draft; R1-1707368; RAN WG1; Hangzhou, China; May 2017.
ZTE, "Discussion on SRS design for NR", 3GPP Draft; R1-1707133; RAN WG1; Hangzhou, China, May 2017.
Huawei et al.: "UL SRS Design for Beam Management, CSI acquisition," R1-1706938, 3rd Generation Partnership Project (3GPP); Meeting #89; Hangzhou, China; May 15-19, 2017; 9 pages.
Nokia et al.: "UL SRS Design Considerations in NR," R1-1708928, 3rd Generation Partnership Project (3GPP); Meeting #89; Hangzhou, China; May 15-19, 2017; 7 pages.
NTT Docomo et al. "New Radio (NR) Access Technology", RP-1711505 SR ON NR-WID; 3rd Generation Partnership Project (3GPP); Meeting #76, West Palm Beach, USA; Jun. 5-8, 2017; 218 pages.
Intel Corporation: "Bandwidth Parts Configmation and Operations," R1-1707420, 3rd Generation Partnership Project (3GPP); Meeting #89; Hangzhou, China; May 15-19, 2017; 5 pages.

* cited by examiner

SOUNDING REFERENCE SIGNAL SEQUENCE DESIGN

CLAIM OF PRIORITY

The present application is a National Stage Entry of, and claims priority to, International Patent Application Serial Number PCT/US18/37155, filed on Jun. 12, 2018 and titled "SOUNDING REFERENCE SIGNAL SEQUENCE DESIGN," which claims priority under 35 U.S.C. § 119(e) to U.S. Provisional Patent Application Ser. No. 62/518,488 filed Jun. 12, 2017 and entitled "SOUNDING REFERENCE SIGNAL SEQUENCE DESIGN FOR NEW RADIO," to U.S. Provisional Patent Application Ser. No. 62/544,628 filed Aug. 11, 2017 and entitled "UPLINK REFERENCE SIGNAL SEQUENCE DESIGN FOR NEW RADIO SYSTEMS," to U.S. Provisional Patent Application Ser. No. 62/567,179 filed Oct. 2, 2017 and entitled "SOUNDING REFERENCE SIGNAL SOUNDING BANDWIDTH TABLE," to U.S. Provisional Patent Application Ser. No. 62/570,006 filed Oct. 9, 2017 and entitled "SOUNDING REFERENCE SIGNAL SOUNDING BANDWIDTH TABLE," to U.S. Provisional Patent Application Ser. No. 62/588,078 filed Nov. 17, 2017 and entitled "SOUNDING REFERENCE SIGNAL (SRS) FREQUENCY AND GROUP HOPPING," and which are herein incorporated by reference in their entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/ 5G mobile networks system. Next-generation wireless cellular communication systems may provide support for higher bandwidths.

Meanwhile, various wireless cellular communication systems may employ Sounding Reference Signals (SRS), which may assist in establishing Uplink (UL) channel quality.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
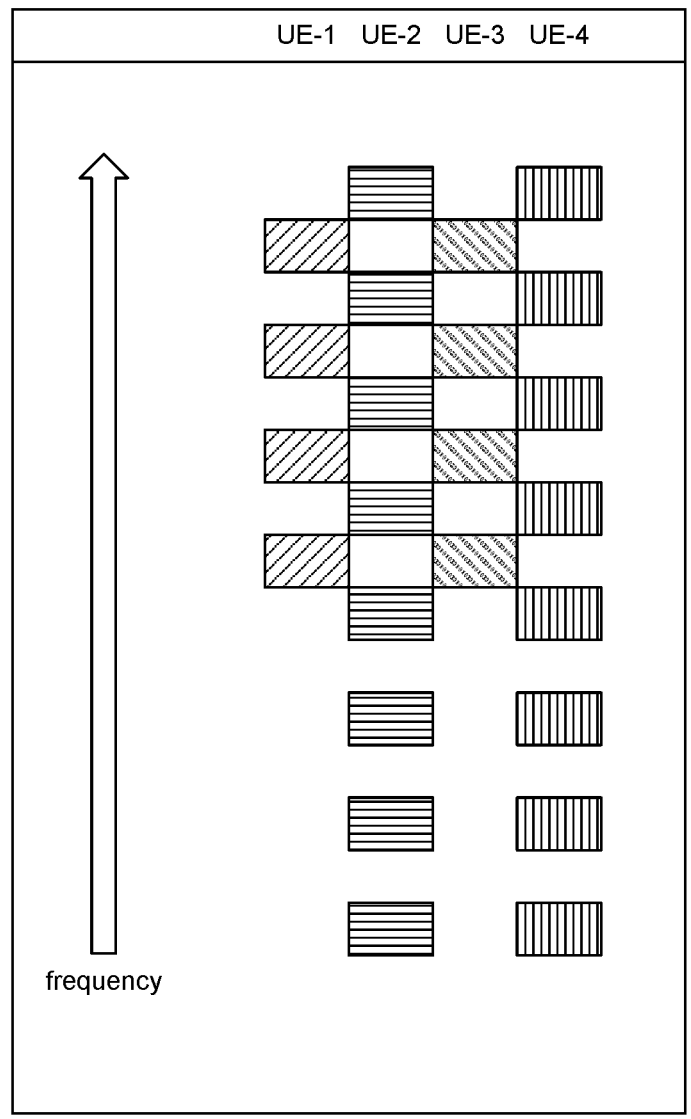
FIG. 1 illustrates a scenario of Sounding Reference Signal (SRS) overlap, in accordance with some embodiments of the disclosure.

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5G) wireless systems/5G mobile networks systems/5G New Radio (NR) systems.

With respect to various embodiments, NR systems may use Zadoff Chu (ZC) sequences for NR SRS sequence design (which may facilitate support for LTE SRS sequences as a subset or special case of NR SRS sequences). Although ZC may possess various properties that may be desirable for designing a reference signal, such as Sounding Reference Signal (SRS), there may be various issues and design details that arise in an NR setting as compared to a legacy LTE setting. For example, a sounding BW used in NR may be significantly larger than for legacy LTE. As another example, in NR it may be desirable to increase an SRS capacity by allowing for scheduling of multiple UEs within a cell or related to a Transmit/Receive Point (TRP) with partial overlap or full overlap of a sounding bandwidth (BW) on the same comb offset.

Disclosed herein are various design details for an SRS sequence design for NR based on ZC sequences. In various embodiments, multiple UE specific SRS configurations may be employed to facilitate a flexible SRS design that supports SRS sequences generated using concatenation of one or more ZC sequences, in addition to supporting pure ZC sequence based design.

Also disclosed herein are designs for NR SRS sequences such that they may be compatible with LTE SRS design, and may simultaneously increase an SRS capacity by allowing for scheduling of multiple UEs within a cell or related to a TRP with partial overlap or full overlap of the sounding BW on substantially the same comb offset. In various embodiments, SRS sequences constructed either by concatenation of one or more block ZC sequences or by truncated portions of one or more long ZC mother sequences, which may be designed for specific TRPs, that may be Time-Division Multiplexed (TDM) or Frequency-Division Multiplexed (FDM) (e.g., via a comb structure of partial band structure) with a legacy LTE like SRS design.

With respect to various embodiments, NR SRS may allow for sounding bandwidths up to 272 PRBs, where the sounding bandwidths may be multiples of 4 PRBs, and a minimum of 4 PRBs may be supported. Furthermore, NR may support UE specific configured bandwidths based on tree-like SRS bandwidth sets (similar to legacy LTE). However, there in comparison with legacy LTE SRS, NR SRS design may accommodate wide band operation beyond 96 PRBs, and may also support bandwidth parts (BWPs), which may further complicate the design of supported SRS sounding BW tables for NR.

In NR, an Uplink (UL) system BW may be as large as 275 PRBs. Additionally, in NR, for a wide band operation, various embodiments may support BWPs. A BWP may be UE specific and may be equal to or smaller than a maximum bandwidth capability supported by a UE. Furthermore, a UE may be configured to have multiple BWPs, and may support Downlink Control Information (DCI) based switching between BWPs.

Disclosed herein are designs to accommodate various challenges mentioned herein and details of supported sets of SRS sounding bandwidths. Various embodiments may design supported sets of SRS bandwidths for NR: Some embodiments may pertain to restricting an overlap of BWPs of different UEs configured on the same SRS resources to be either full overlap or no overlap. Some embodiments may pertain to allowing multiple SRS configurations for each UE for each configured BWP. Some embodiments may pertain to designs for supported sets of SRS sounding BW based on the LTE design for up to 96 PRB, and extended beyond 96 PRBs and up to 272 PRB.

With respect to various embodiments, NR SRS may support periodic, aperiodic, and/or semi-persistent NR-SRS transmission. An SRS resource of X ports may span a number N of adjacent OFDM symbols within the same slot, where N=1, 2, or 4, and where all X ports are mapped to each symbol of the resource. Furthermore, NR may support a single SRS bandwidth table consist of multiple values of $C_{SRS}$ and 4 values of $B_{SRS}$. Moreover, NR may also support configurable frequency hopping (e.g., intra-slot and/or inter-slot) within a BWP (or partial band) for a UE. The hopping pattern may be within a tree structure defined by a given $C_{SRS}$, $B_{SRS}$, and $b_{HOP}$, all of which may be UE specific (e.g., specifically configured by UE). In addition, an NR system may also support group and sequence hopping (as in legacy LTE).

Disclosed herein are further design details for supporting frequency and group hopping (and/or sequence-within-a-group hopping) of SRS transmission for NR MIMO (Multiple Input Multiple Output).

Some embodiments may pertain to intra-slot types of frequency hopping, inter-slot types of frequency hopping, and/or combinations of those two types of frequency hopping. Various embodiments may support frequency hopping for various types of SRS transmission (e.g., aperiodic, periodic, and/or semi-persistent SRS). Various embodiments may reuse a frequency hopping formula modified to accumulatively, across multiple slots (including one or more symbols per slot), count the number of symbols available for SRS transmission.

Some embodiments may pertain to group hopping. Some embodiments may comprise a random choice of a sequence index v within an instantaneous group based on the same random number being used for selecting a group ID during hopping.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

With respect to various embodiments, an SRS may be a reference signal transmitted by a UE in a UL direction which may be used by a gNB to estimate a UL channel quality for UL frequency-selective scheduling. An SRS may also be used for other purposes, such as to obtain downlink Channel State Information (CSI) in the case of Time-Division Duplex (TDD) systems with reciprocity, or for UL timing estimation as part of a timing alignment procedure.

SRS of different UEs transmitted in the same symbol may be disposed to occupying different bandwidths, with potential overlap, while maintaining zero to low interference between the transmissions, which may advantageously support frequency-selective scheduling. Accordingly, in various embodiments, an SRS sequence design may allow for multiple users to transmit SRS that have full overlap and/or partial overlap of SRS time-frequency resources. Moreover, in various embodiments, An NR SRS sequence may be based on one or more ZC sequences and/or may support usage of LTE SRS sequences as a sub-set or special case of an NR SRS design. Furthermore, an NR SRS design may allow for multiple users to transmit SRS that have full overlap and/or partial overlap of SRS time-frequency resources, if scheduled or deemed helpful.

In legacy LTE, users with full-overlap of time-frequency SRS resources may maintain an orthogonal separation of SRS transmissions using different cyclic time shifts of the same Reference Signal (RS) sequence. Although this may work well in scenarios of completely overlapping assignments, this may not work well for users that have SRS resources with partial BW overlap.

Figure 2:
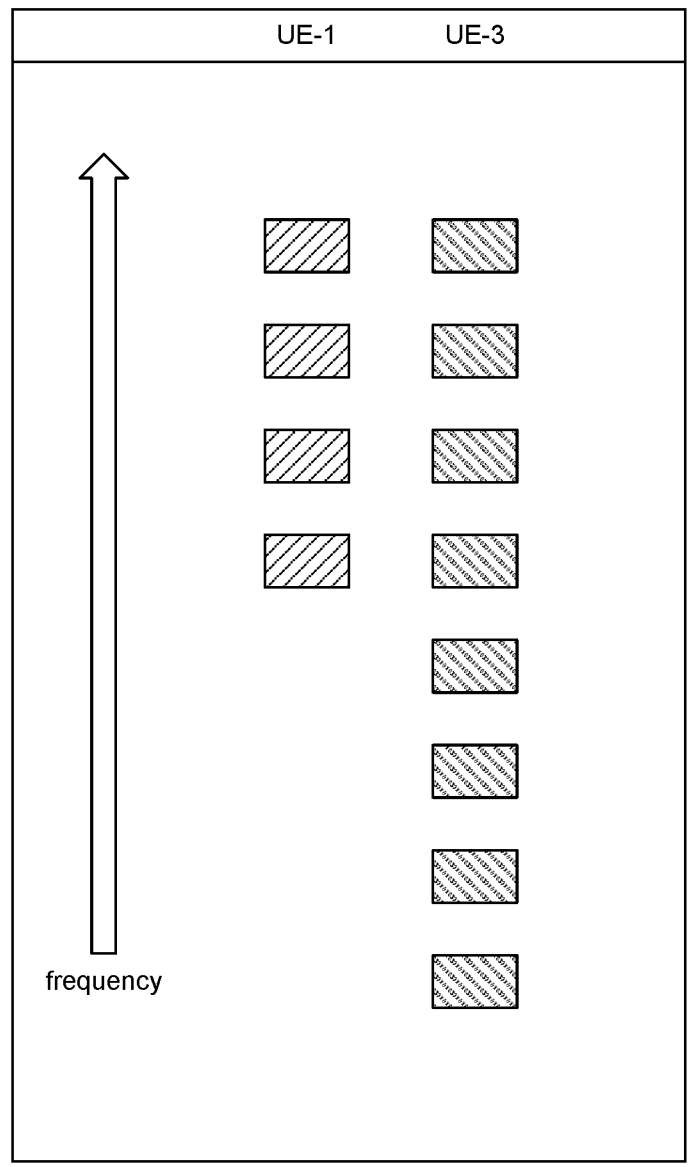
FIG. 2 illustrates a scenario of SRS overlap, in accordance with some embodiments of the disclosure.

FIG. 1 illustrates a scenario of SRS overlap, in accordance with some embodiments of the disclosure. A scenario 100 provides an example of overlap, in which two UEs (e.g., a UE-1 and a UE-3) have the same sounding bandwidth and comb offset and use the same base ZC sequence with different cyclic time-shifts, and hence have zero cross-correlation between the SRS transmissions from these users. Similarly, a two other UEs (e.g., a UE-2 and a UE-4) also have the same sounding bandwidth and comb offset and use the same base ZC sequence with different cyclic time-shifts, and hence have zero cross-correlation between the SRS transmissions from these users In contrast, FIG. 2 illustrates a scenario of SRS overlap, in accordance with some embodiments of the disclosure. A scenario 200 provides an example in which two overlapping UEs (e.g., a UE-1 and a UE-3) use ZC sequences with different roots, and hence resulting in significant interference or high cross-correlation values between the SRS transmissions of UE-1 and UE-3. Although having multiple Interleaved Single-Carrier Frequency Division Multiple Access (IFDMA) combs may provide some flexibility in sounding bandwidth allocations, it may still be restrictive, such as in NR designs in which a system BW may be much larger than in legacy LTE.

In addition, a BW in NR may be significantly higher and ZC phase values may experience stability issues when a sequence length is large. This may in turn be detrimental in designing SRS for larger sounding BW using pure ZC sequences.

Various embodiments may incorporate multiple ways to design SRS sequences to address assignment of partially overlapping sounding BWs.

One possible solution to resolve both various issues related to supporting larger sounding BW, as well as supporting orthogonal SRS transmission with partial overlapping SRS resource assignments, may be establish that a base sequence to be used by multiple users in an overlapping time-frequency SRS resource is identical. A piecewise orthogonality may then be advantageously achieved using distinct cyclic time shifts of the common base sequence.

Figure 3:
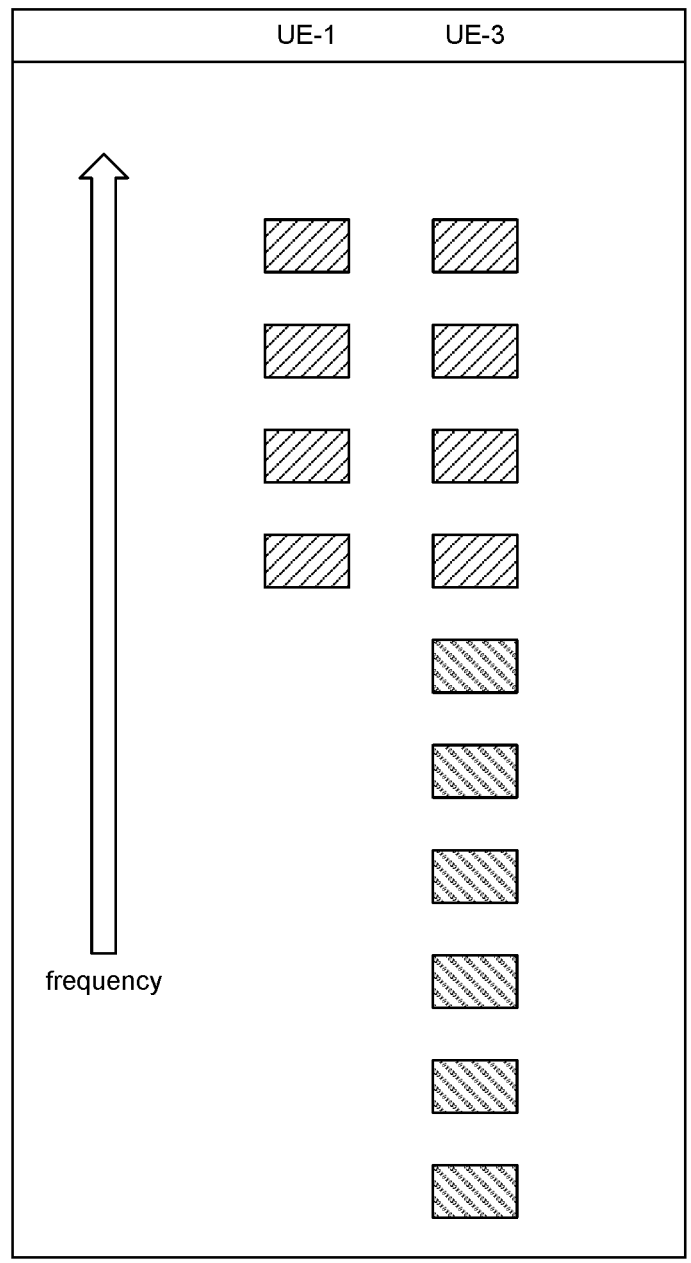
FIG. 3 illustrates a scenario of SRS overlap, in accordance with some embodiments of the disclosure.

For example, FIG. 3 illustrates a scenario of SRS overlap, in accordance with some embodiments of the disclosure. A scenario 300 provides an example of two users (e.g., a UE-1 and a UE-3) that may have unequal and overlapping SRS resources. UE-3 may use a block concatenated sequence, such that in an overlapping zone (depicted as having the same cross-hatching), sequences used by both UE-1 and UE-3 may be identical up to a cyclic time-shift.

With respect to various embodiments, in LTE, an eNB may configure a UE with a UE specific SRS configuration, which may provide the UE with various details regarding SRS transmission, such as time domain resources (e.g., subframes), frequency domain resources, transmission comb indices, cyclic shifts, sounding BW, and so forth. These, along with cell-specific configuration details, may enable a UE to generate an SRS sequence in LTE.

NR may use a legacy LTE framework to generate SRS sequences consisting of concatenations of one or more ZC sequences. In various embodiments, NR may configure a UE with multiple SRS configurations, which may be active (e.g., triggered) for transmission in the same UL symbol. A gNB may control details such as numbers of blocks to be concatenated, frequency domain locations of the blocks (e.g., contiguous locations or non-contiguous locations), BW of various blocks, roots of the ZC to be used in different blocks (e.g., the same root or different roots), cyclic shifts to be used in various blocks, and so forth.

Block concatenation of ZC sequences may impact Peak-to-Average Power Ratio (PAPR), which careful design may advantageously help to alleviate. A gNB may decide an assignment of concatenation (if any) based on a corresponding use case and may achieve a desired PAPR on UL transmissions for each UE.

With respect to various embodiments, a block concatenated sequence may be constructed from concatenation of two blocks, with a relative phase rotation (or time domain cyclic shift) between the concatenated blocks, where the phase rotation is chosen so as to minimize a PAPR or a CM of the resulting SRS sequence. In some embodiment, a number of blocks to be concatenated may be configurable and/or signaled to various users (e.g., UEs). This design may be compatible with legacy LTE SRS designs in the sense that it may use various LTE SRS sequences (e.g., pure ZC sequence based SRS) as a part of NR SRS sequences. Additionally, merely those users (e.g., UEs) that are scheduled for transmission of the concatenation based sequences may be signaled in such a manner, and the design may be transparent to UEs that are scheduled for no concatenation, or one block ZC sequence transmission. Such a design may also advantageously be compatible with co-existence of LTE-NR neighboring cells.

In some embodiment, NR SRS sequences may comprise two classes of sequences. A first class of sequences may (like legacy LTE sequences) be based on ZC sequences, in which different root sequences may be used for constructing sounding sequences for different sounding bandwidth lengths. For a second class of sequences, one or more mother ZC sequences, per TRP (and/or cell and/or gNB) may be constructed, and may typically be of large length (e.g., long enough to cover a system wide bandwidth).

One or more users may then be configured to either use sequences from one class or other. The configuration may be static, semi-static, and/or dynamic. The different class sequences may be separated in the resources either in the time domain (e.g., different transmission opportunities) or in the frequency domain (e.g., different partial bands or comb offsets). When using sequences from the class of long truncated ZC sequences, various users may use truncated portions of the sequence corresponding to the assigned sounding BW. Note that the second class of sequences may be resource specific (e.g., may be a function of a sounding location or PRB indices rather than just sounding BW length).

Accordingly, various embodiments may pertain to methods of supporting transmission and measurement of SRS signals at the UE and the gNB, wherein the methods may include configuring a UE, preparing SRS, transmission of SRS from the UE, reception of the SRS at a gNB, and appropriate processing of the SRS at the gNB.

In some embodiments, SRS sequences may be designed based on ZC sequences. For some embodiments, an SRS sequence may comprise a concatenation of one or more blocks of ZC sequences. In some embodiments, a UE may be configured with multiple UE specific SRS configurations. For some embodiments, multiple UE specific SRS configurations may be active or triggered for SRS transmission in the same UL symbol.

In some embodiments, different UE specific SRS configurations that are active for SRS transmission simultaneously may be scheduled on adjacent frequency domain resources. For some embodiments, different UE specific SRS configurations that are active for SRS transmission simultaneously may be configured on non-adjacent frequency domain resources. In some embodiments, different UE specific SRS configurations that are active for SRS transmission simultaneously may be configured to have equal sounding bandwidths. For some embodiments, different UE specific SRS configurations that are active for SRS transmission simultaneously may be configured to have un-equal sounding bandwidths. In some embodiments, different UE specific SRS configurations that are active for SRS transmission simultaneously may be configured to have same ZC sequence roots. For some embodiments, different UE specific SRS configurations that are active for SRS transmission simultaneously may be configured to have different ZC sequence roots. In some embodiments, different UE specific SRS configurations that are active for SRS transmission simultaneously may be configured to have certain specific relation among the cyclic shifts, which may advantageously facilitate achieving certain PAPR or Cubic Metric (CM) goals for SRS transmission.

In some embodiments, different blocks may use ZC sequences of different roots. For some embodiments, different blocks may use block relative phase rotation, which may advantageously reduce a PAPR or a CM of an effective sequence. In some embodiments, a system may be deployed in co-existence with LTE cells. For some embodiments, both users assigned concatenation based sequence generation and users with no concatenation may be multiplexed on the same time-frequency resource. In some embodiments, frequency and sequence hopping may be supported. For some embodiments, an SRS sequence may comprise concatenation of one or more blocks of ZC sequences. In some embodiments, one or more long mother ZC sequences may be designed for each TRP (and/or gNB, and/or cell).

For some embodiments, the system may be deployed in co-existence with LTE cells. In some embodiments, users assigned concatenation based sequence generation and users with no concatenation may be multiplexed in a TDM manner or in an FDM manner. For some embodiments, frequency hopping and/or sequence hopping may be supported.

With respect to various embodiments, SRS may be transmitted by a UE in a UL direction, and may be used by a gNB to estimate a UL channel quality for UL frequency-selective scheduling. It may also be used for other purposes, such obtaining Downlink (DL) CSI in the case of a TDD system with reciprocity, or for obtaining UL timing estimation as part of timing alignment procedure.

In legacy LTE, SRS sounding bandwidths may be specified by a cell-specific parameter (e.g., $C_{SRS}$) and a UE-specific parameter (BSRS). The SRS BWs that legacy LTE supports may be different for different UL system bandwidths. For example, Table 1 below provides UL system bandwidths between 6 PRB to 40 PRB. Note various rows of Table 1 (selected by CSRS) have a tree-like nested structure convenient for frequency hopping of narrow band SRS sounding.

TABLE 1

Table for UL system bandwidth between 6 PRB and 40 PRB

| SRS Bandwidth configuration | SRS Bandwidth $B_{SRS} = 0$ | | SRS Bandwidth $B_{SRS} = 1$ | | SRS Bandwidth $B_{SRS} = 2$ | | SRS Bandwidth $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 20 | 1 | 4 | 5 | 4 | 1 | 4 | 1 |
| 5 | 24 | 1 | 4 | 6 | 4 | 1 | 4 | 1 |
| 6 | 32 | 1 | 16 | 2 | 8 | 2 | 4 | 2 |
| 7 | 36 | 1 | 12 | 3 | 4 | 3 | 4 | 1 |

NR may support UE specific configured bandwidths based on tree-like SRS bandwidth sets (which may be analogous to legacy LTE). However, there may be various differences in NR SRS design compared to legacy LTE SRS.

For example, in NR, a UL system BW may be as large as 275 PRBs. Accordingly, NR designs may be predisposed to comprise new sets of options for SRS sounding for larger BWs. Additionally, in NR, for wide band operation, systems may support BWPs. A BWP may be UE specific and may be equal to or smaller than a maximal bandwidth capability supported by a UE.

Moreover, NR SRS design may support sounding substantially all UL PRBs in a BWP. Furthermore, a UE may be configured to have multiple BWPs with DCI based switching between BWP. This may complicate the design of a nested tree-like structure (analogous to legacy LTE) for supported SRS BWs.

$C_{SRS}$ and $B_{SRS}$ may be UE specific. Note that the nested tree-like structure may be relation between the SRS sounding allocations of different UE's within a cell. For NR, since both the configuration parameters $C_{SRS}$ and $B_{SRS}$ may be UE specific, the nested tree-like structure might not be guaranteed solely by a table of supported SRS sounding BW, but may be at least in part enforced using restrictions or rules for network and/or gNB implementation. For example, in Table 1, a gNB might not configure two UEs within a cell (e.g., a UE-1 and a UE-2) to have $C_{SRS}$ equal to 6 and 7, while setting $B_{SRS}$ equal to 1 and 1, respectively.

In various embodiments, an NR gNB and/or network implementation may be disposed to enforcing a nested tree-like structure among SRS sounding allocations of various configured UE's within a cell.

Another aspect of BWP that may complicate NR SRS design is the overlap of BWP among different UEs. If no further constraints are specified, the BWP of two different UEs within a cell may overlap by any amount. Accordingly, if UEs with partially overlapping BWs sound on overlapping BW at the same time and/or with the same comb offset, it may result in non-trivial interference. Hence, in some embodiments, the BWP of different UEs within a cell may be configured in the same sounding resource either to not overlap or to overlap completely (e.g., a larger BWP subsuming a smaller BWP). Furthermore, in some embodiments, the active BWP of a UE may be switched using DCI signaling. A UE may be disposed to being configured with one or more SRS resource configurations for each configured BWP.

In various embodiments, the sets of SRS BW for wideband NR operation may be extended as presented in Table 2 below.

TABLE 2

Table for UL system bandwidth between 120 PRB and 272 PRB

| SRS Bandwidth $B_{SRS} = 0$ | | SRS Bandwidth $B_{SRS} = 1$ | | SRS Bandwidth $B_{SRS} = 2$ | | SRS Bandwidth $B_{SRS} = 3$ | |
|---|---|---|---|---|---|---|---|
| $m_{SRS,0}$ | $N_0$ | $m_{SRS,1}$ | N1 | $m_{SRS,2}$ | N2 | $m_{SRS,3}$ | N3 |
| 120 | 1 | 60 | 2 | 20 | 3 | 4 | 5 |
| 128 | 1 | 64 | 2 | 32 | 2 | 4 | 8 |
| 128 | 1 | 64 | 2 | 16 | 4 | 4 | 4 |
| 128 | 1 | 32 | 4 | 16 | 2 | 4 | 4 |
| 144 | 1 | 72 | 2 | 24 | 3 | 4 | 6 |
| 144 | 1 | 36 | 4 | 12 | 3 | 4 | 3 |
| 160 | 1 | 80 | 2 | 20 | 4 | 4 | 5 |
| 160 | 1 | 40 | 4 | 20 | 2 | 4 | 5 |
| 192 | 1 | 96 | 2 | 32 | 3 | 4 | 8 |
| 192 | 1 | 96 | 2 | 24 | 4 | 4 | 6 |
| 192 | 1 | 48 | 4 | 24 | 2 | 4 | 6 |
| 240 | 1 | 120 | 2 | 40 | 3 | 4 | 10 |
| 240 | 1 | 60 | 4 | 20 | 3 | 4 | 5 |
| 256 | 1 | 128 | 2 | 32 | 4 | 4 | 8 |
| 256 | 1 | 64 | 4 | 32 | 2 | 4 | 8 |
| 272 | 1 | 136 | 2 | 34 | 4 | 17 | 2 |

In various embodiments, the sets of SRS BW for wideband NR operation may be extended as presented in Table 3 below.

TABLE 3

Table for UL system bandwidth between 120 PRB and 272 PRB

| SRS Bandwidth $B_{SRS}=0$ | | SRS Bandwidth $B_{SRS}=1$ | | SRS Bandwidth $B_{SRS}=2$ | | SRS Bandwidth $B_{SRS}=3$ | |
|---|---|---|---|---|---|---|---|
| $m_{SRS,0}$ | $N_0$ | $m_{SRS,1}$ | N1 | $m_{SRS,2}$ | N2 | $m_{SRS,3}$ | N3 |
| 120 | 1 | 60 | 2 | 20 | 3 | 4 | 5 |
| 120 | 1 | 40 | 3 | 8 | 5 | 4 | 2 |
| 120 | 1 | 24 | 5 | 12 | 2 | 4 | 3 |
| 128 | 1 | 64 | 2 | 32 | 2 | 4 | 8 |
| 128 | 1 | 16 | 8 | 8 | 2 | 4 | 2 |
| 144 | 1 | 72 | 2 | 36 | 2 | 4 | 9 |
| 144 | 1 | 48 | 3 | 24 | 2 | 12 | 2 |
| 144 | 1 | 16 | 9 | 8 | 2 | 4 | 2 |
| 160 | 1 | 80 | 2 | 40 | 2 | 20 | 2 |
| 160 | 1 | 32 | 5 | 16 | 2 | 4 | 4 |
| 192 | 1 | 96 | 2 | 48 | 2 | 12 | 4 |
| 192 | 1 | 64 | 3 | 32 | 2 | 16 | 2 |
| 192 | 1 | 24 | 8 | 8 | 3 | 4 | 2 |
| 240 | 1 | 120 | 2 | 60 | 2 | 4 | 15 |
| 240 | 1 | 80 | 3 | 40 | 2 | 20 | 2 |
| 240 | 1 | 48 | 5 | 16 | 3 | 8 | 2 |
| 240 | 1 | 24 | 10 | 12 | 2 | 4 | 3 |
| 256 | 1 | 128 | 2 | 64 | 2 | 32 | 2 |
| 256 | 1 | 16 | 16 | 8 | 2 | 4 | 2 |
| 272 | 1 | 136 | 2 | 68 | 2 | 4 | 17 |
| 272 | 1 | 16 | 17 | 8 | 2 | 4 | 2 |

In NR, unlike legacy LTE in which the row of the table may be cell-specific and column may be UE specific, in Tables 2 and 3, both the row and the column may be UE specific (e.g., may be specifically configured by UE). As a result, the values in Table 3 (for example) may be such that a UE may advantageously sound a maximum BW in one or more rows using minimal narrowband sounding instances. Also, NR systems may support narrow band sounding values that are either supported in legacy LTE SRS tables, or are multiples of legacy LTE SRS table values, which may advantageously facilitate backward compatibility with legacy LTE systems and/or devices.

Accordingly, various embodiments may pertain to methods of channel measurement and CSI calculation at a gNB. The methods may include configuration of the SRS resource for a UE. The methods may also include transmission of the UL reference signal channel (e.g., SRS) from a UE, and reception and CSI estimation at a gNB.

In some embodiments, a UE may be configured to operate over a specific bandwidth regime BWP. For some embodiments, a UE may be configured with one or more BWP, out of which one may be active at a time. In some embodiments, an active BWP may be switched using DCI signaling. For some embodiments, a UE may be configured with one or more SRS resources per configured BWP for that UE.

In some embodiments, one or more UEs configured on the same SRS resources may either have no overlap in active BWP, or have complete overlap (such as when a larger BWP subsumes a smaller BWP or an equal sized BWP). For some embodiments, the gNB may use values specified in Table 2 and/or Table 3 as one or more sets of supported bandwidths for sounding SRS in NR. In some embodiments, a scheduler at a gNB may assign consistent values to different UEs within its cell such that a relation between the SRS BW assigned to different UEs forms a nested tree-like structure. For some embodiments, supported sounding BW may be integer multiples of values supported in legacy LTE SRS sounding tables.

With respect to various embodiments, a sounding reference signal sequence $r_{SRS}^{(p)}(n)$ may be mapped in sequence, starting with $r_{SRS}^{(p)}(0)$, to resource elements (k, l) on an antenna port p in accordance with the following relationship:

$$a_{K_{TC}k'+k_0^{(p)},l}^{(p)} = \begin{cases} \frac{1}{\sqrt{N_{ap}}} r_{SRS}^{(p)}(k') & k' = 0, 1, \ldots, M_{sc,b}^{RS} - 1 \\ 0 & \text{otherwise} \end{cases}$$

where $N_{ap}$ may be a number of antenna ports used for sounding reference signal transmission.

A quantity $k_0^{(p)}$ may be a frequency-domain starting position of the sounding reference signal, and for $b=B_{SRS}$, a length of the sounding reference signal sequence $M_{sc,b}^{RS}$ may be defined as:

$$M_{sc,b}^{RS} = m_{SRS,b} N_{sc}^{RB}/K_{TC}$$

where $M_{SRS,b}$ may be a number of PRBs from an SRS BW table selected based on one or more UE specific configuration parameters.

A frequency-domain starting position $k_0^{(p)}$ may be defined by:

$$k_0^{(p)} = \bar{k}_0^{(p)} + \sum_{b=0}^{B_{SRS}} K_{TC} M_{sc,b}^{RS} n_b$$

where $\bar{k}_0^{(p)}$ may be a frequency offset to center the transmission of SRS around a desired frequency band (e.g., around a center of a UL system BW). A frequency hopping of the sounding reference signal may be configured by a parameter $b_{hop} \in \{0,1,2,3\}$, which may be provided by a higher-layer parameter (such as srs-HoppingBandwidth).

If frequency hopping of a sounding reference signal is not enabled (i.e., $b_{hop} \geq B_{SRS}$), a frequency position index $n_b$ may remain constant (unless re-configured), and may be defined by:

$$n_b = \lfloor 4n_{RRC}/m_{SRS,b} \rfloor \bmod N_b$$

where the parameter $n_{RRC}$ may be given by higher-layer parameters (e.g., freqDomainPosition for periodic transmission and/or freqDomainPosition-ap for one or more configurations of aperiodic transmission).

If frequency hopping of the sounding reference signal is enabled (i.e., $b_{hop} < B_{SRS}$), the frequency position indexes $n_b$ may be defined by:

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

where $N_b$ is given by Table in [7].

$$F_b(n_{SRS}) = \begin{cases} (N_b/2) \left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS}/\prod_{b'=b_{hop}}^{b-1} N_{b'} \right\rfloor & \text{if } N_b \text{ odd} \end{cases}$$

where $N_{b_{hop}}=1$ regardless of the $N_b$ value, and $n_{SRS}$ may count a total number of the number of UE-specific SRS transmissions.

There may be various options for counting $n_{SRS}$. In accordance with a first option, $n_{SRS}$ may be the number of UE-specific SRS transmission slots. This may result in inter-slot frequency hopping of SRS. In accordance with a second option, $n_{SRS}$ may be the number of UE-specific SRS transmission symbols within a slot. This may result in intra-slot frequency hopping of SRS. In accordance with a third option, $n_{SRS}$ may be the number of UE-specific SRS transmission symbols accumulative across multiple slots. This may result in a frequency hopping across intra and inter slot transmission opportunities.

Other values in the above formulae may be determined based on an SRS subframe configuration table. In various embodiments, NR may support an intra-slot only frequency hopping for aperiodic SRS. For various embodiments, for periodic and semi-persistent SRS, NR may support all three of the above options for frequency hopping alternatives.

With respect to group and sequence hopping, a sequence-group number u in a slot $n_s$ may be defined by a group hopping pattern $f_{gh}(n_s)$ and a sequence-shift pattern $f_{ss}$ according to:

$$u=(f_{gh}(n_s)+F_{ss}) \bmod 30$$

where the group-hopping pattern $f_{gh}$ ($n_s$) for SRS may be given by:

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases}$$

where a pseudo-random sequence c(i) may be generated based on a Gold code initialized with seed values dependent on an SRS Identifier (ID).

When group hopping is enabled in legacy LTE, the sequence ID within the group may be fixed to v=0. In some embodiments, for NR, the sequence ID v=0 or 1 may be changed as follows:

$$v(n_s) = \left\{\left(\sum_{i=0}^{7} c(8n_s + i) \cdot 2^i\right) \bmod 2\right.$$

Accordingly, in various embodiments, sequence hopping may be enabled along with group hopping for more randomization and interference management.

Various embodiments may accordingly pertain to methods of channel measurement and CSI calculation at the gNB, which may include configuration of the SRS resource for a UE Transmission of the UL reference signal channel (e.g., SRS) from a UE, and reception and CSI estimation at a gNB.

In some embodiments, the UE may be configured with no resources, or one or more aperiodic, periodic, and/or semi-persistent SRS resources. For some embodiments, each SRS resource may comprise 1, 2, or 4 symbols per slot. In some embodiments, intra-slot frequency hopping of SRS, inter-slot frequency hopping of SRS, or a combination of the two may be supported.

For some embodiments, only intra-slot frequency hopping may be supported for aperiodic SRS resource. In some embodiments, the frequency hopping formula may be as discussed herein. For some embodiments, the number of SRS transmissions may be counted either for one slot, one count per slot, or accumulatively across multiple slots.

In some embodiments, group hopping for SRS transmission may be supported. For some embodiments, in addition to group hopping, sequence hopping may be simultaneously enabled as well. In some embodiments, a random number used for sequence hopping along with group hopping may be given as discussed herein.

Figure 4:
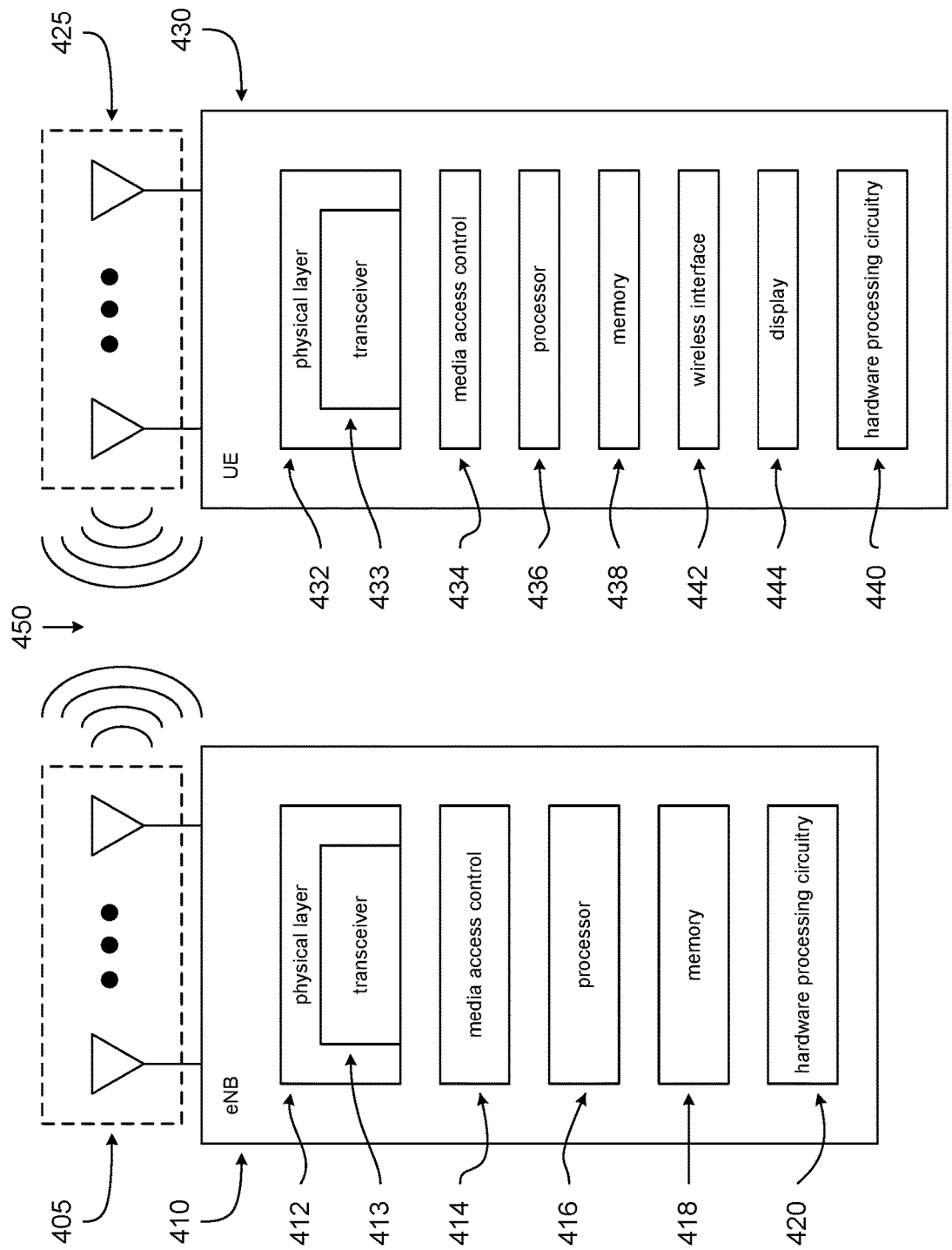
FIG. 4 illustrates an Evolved Node-B (eNB) and a User Equipment (UE), in accordance with some embodiments of the disclosure.

FIG. 4 illustrates an eNB and a UE, in accordance with some embodiments of the disclosure. FIG. 4 includes block diagrams of an eNB 410 and a UE 430 which are operable to co-exist with each other and other elements of an LTE network. High-level, simplified architectures of eNB 410 and UE 430 are described so as not to obscure the embodiments. It should be noted that in some embodiments, eNB 410 may be a stationary non-mobile device.

eNB 410 is coupled to one or more antennas 405, and UE 430 is similarly coupled to one or more antennas 425. However, in some embodiments, eNB 410 may incorporate or comprise antennas 405, and UE 430 in various embodiments may incorporate or comprise antennas 425.

In some embodiments, antennas 405 and/or antennas 425 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 405 are separated to take advantage of spatial diversity.

eNB 410 and UE 430 are operable to communicate with each other on a network, such as a wireless network. eNB 410 and UE 430 may be in communication with each other over a wireless communication channel 450, which has both a downlink path from eNB 410 to UE 430 and an uplink path from UE 430 to eNB 410.

As illustrated in FIG. 4, in some embodiments, eNB 410 may include a physical layer circuitry 412, a MAC (media access control) circuitry 414, a processor 416, a memory 418, and a hardware processing circuitry 420. A person skilled in the art will appreciate that other components not shown may be used in addition to the components shown to form a complete eNB.

In some embodiments, physical layer circuitry 412 includes a transceiver 413 for providing signals to and from UE 430. Transceiver 413 provides signals to and from UEs or other devices using one or more antennas 405. In some embodiments, MAC circuitry 414 controls access to the wireless medium. Memory 418 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 420 may comprise logic devices or circuitry to perform various operations. In some embodiments, processor 416 and memory 418 are arranged to perform the operations of hardware processing circuitry 420, such as operations described herein with reference to logic devices and circuitry within eNB 410 and/or hardware processing circuitry 420.

Accordingly, in some embodiments, eNB 410 may be a device comprising an application processor, a memory, one or more antenna ports, and an interface for allowing the application processor to communicate with another device.

As is also illustrated in FIG. 4, in some embodiments, UE 430 may include a physical layer circuitry 432, a MAC circuitry 434, a processor 436, a memory 438, a hardware processing circuitry 440, a wireless interface 442, and a display 444. A person skilled in the art would appreciate that other components not shown may be used in addition to the components shown to form a complete UE.

In some embodiments, physical layer circuitry 432 includes a transceiver 433 for providing signals to and from eNB 410 (as well as other eNBs). Transceiver 433 provides signals to and from eNBs or other devices using one or more antennas 425. In some embodiments, MAC circuitry 434 controls access to the wireless medium. Memory 438 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 442 may be arranged to allow the processor to communicate with another device. Display 444 may provide a visual and/or tactile display for a user to interact with UE 430, such as a touch-screen display. Hardware processing circuitry 440 may comprise logic devices or circuitry to perform various operations. In some embodiments, processor 436 and memory 438 may be arranged to perform the operations of hardware processing circuitry 440, such as operations described herein with reference to logic devices and circuitry within UE 430 and/or hardware processing circuitry 440.

Accordingly, in some embodiments, UE 430 may be a device comprising an application processor, a memory, one or more antennas, a wireless interface for allowing the application processor to communicate with another device, and a touch-screen display.

Elements of FIG. 4, and elements of other figures having the same names or reference numbers, can operate or function in the manner described herein with respect to any such figures (although the operation and function of such elements is not limited to such descriptions). For example, FIGS. 5-6 and 9-10 also depict embodiments of eNBs, hardware processing circuitry of eNBs, UEs, and/or hardware processing circuitry of UEs, and the embodiments described with respect to FIG. 4 and FIGS. 5-6 and 9-10 can operate or function in the manner described herein with respect to any of the figures.

In addition, although eNB 410 and UE 430 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 5:
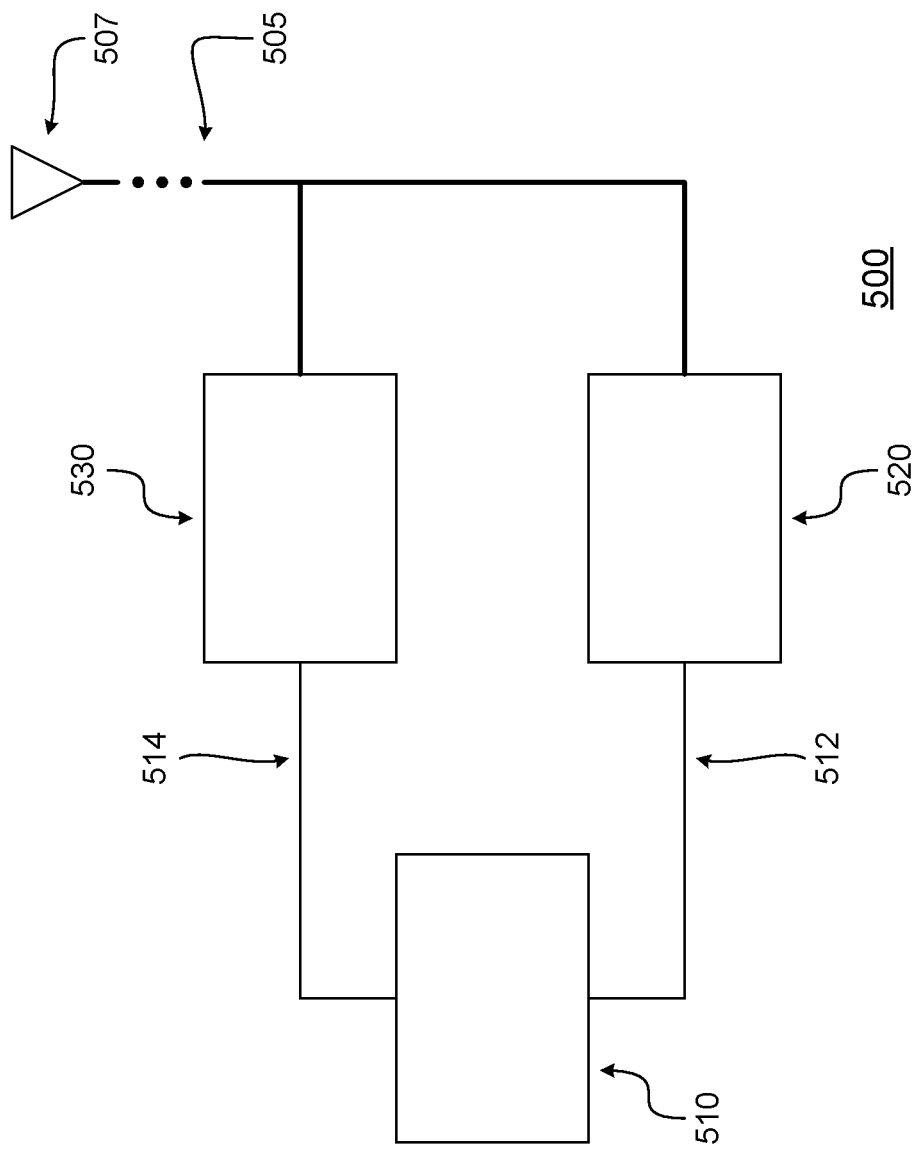
FIG. 5 illustrates hardware processing circuitries for an eNB for flexible SRS sequence design, in accordance with some embodiments of the disclosure.

FIG. 5 illustrates hardware processing circuitries for an eNB for flexible SRS sequence design, in accordance with some embodiments of the disclosure. With reference to FIG. 4, an eNB may include various hardware processing circuitries discussed herein (such as hardware processing circuitry 5 of FIG. 5), which may in turn comprise logic devices and/or circuitry operable to perform various operations. For example, in FIG. 4, eNB 410 (or various elements or components therein, such as hardware processing circuitry 420, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 416 (and/or one or more other processors which eNB 410 may comprise), memory 418, and/or other elements or components of eNB 410 (which may include hardware processing circuitry 420) may be arranged to perform the operations of these hardware processing circuitries, such as operations described herein with reference to devices and circuitry within these hardware processing circuitries. In some embodiments, processor 416 (and/or one or more other processors which eNB 410 may comprise) may be a baseband processor.

Returning to FIG. 5, an apparatus of eNB 410 (or another eNB or base station), which may be operable to communicate with one or more UEs on a wireless network, may comprise hardware processing circuitry 500. In some embodiments, hardware processing circuitry 500 may comprise one or more antenna ports 505 operable to provide various transmissions over a wireless communication channel (such as wireless communication channel 450). Antenna ports 505 may be coupled to one or more antennas 507 (which may be antennas 405). In some embodiments, hardware processing circuitry 500 may incorporate antennas 507, while in other embodiments, hardware processing circuitry 500 may merely be coupled to antennas 507.

Antenna ports 505 and antennas 507 may be operable to provide signals from an eNB to a wireless communications channel and/or a UE, and may be operable to provide signals from a UE and/or a wireless communications channel to an eNB. For example, antenna ports 505 and antennas 507 may be operable to provide transmissions from eNB 410 to wireless communication channel 450 (and from there to UE 430, or to another UE). Similarly, antennas 507 and antenna ports 505 may be operable to provide transmissions from a wireless communication channel 450 (and beyond that, from UE 430, or another UE) to eNB 410.

Hardware processing circuitry 500 may comprise various circuitries operable in accordance with the various embodiments discussed herein. With reference to FIG. 5, hardware processing circuitry 500 may comprise a first circuitry 510, a second circuitry 520, and/or a third circuitry 530.

In various embodiments, first circuitry 510 may be operable to determine a first SRS sequence and a second SRS sequence. Second circuitry 520 may be operable to process a first UL transmission from the first UE incorporating the first SRS sequence over a first set of subcarrier frequencies. Second circuitry 520 may also be operable to process a second UL transmission from the second UE incorporating the second SRS sequence over a second set of subcarrier frequencies. An interface 512 may be operable to provide information regarding the first SRS sequence and/or the second SRS sequence to second circuitry 520. The second SRS sequence may comprise at least a first block that overlaps the first set of subcarrier frequencies and a second block that does not overlap the first set of subcarrier frequencies. Hardware processing circuitry 500 may also comprise an interface for sending the first transmission and the second transmission to a transmission circuitry.

In some embodiments, the first SRS sequence and the second SRS sequence may be established based on the same ZC sequence. For some embodiments, the first SRS sequence and the first block of the second SRS sequence may be established based on a first ZC sequence, and the second block of the second SRS sequence may be established based on a second ZC sequence.

For some embodiments, third circuitry 530 may be operable to generate a configuration transmission to the first UE comprising one or more parameters of the first SRS sequence. Third circuitry 530 may also be operable to generate a configuration transmission to the second UE comprising one or more parameters of the second SRS sequence. An interface 512 may be operable to provide one or more parameters of the first SRS sequence and/or one or more parameters of the second SRS sequence to second circuitry 520.

In some embodiments, the first SRS sequence and the second SRS sequence may be received in the same OFDM symbol. For some embodiments, the first block of the second SRS sequence may have a relative phase rotation with respect to the second block of the second SRS sequence.

In some embodiments, first circuitry 510, second circuitry 520, and/or third circuitry 530 may be implemented as separate circuitries. In other embodiments, first circuitry 510, second circuitry 520, and/or third circuitry 530 may be combined and implemented together in a circuitry without altering the essence of the embodiments.

Figure 6:
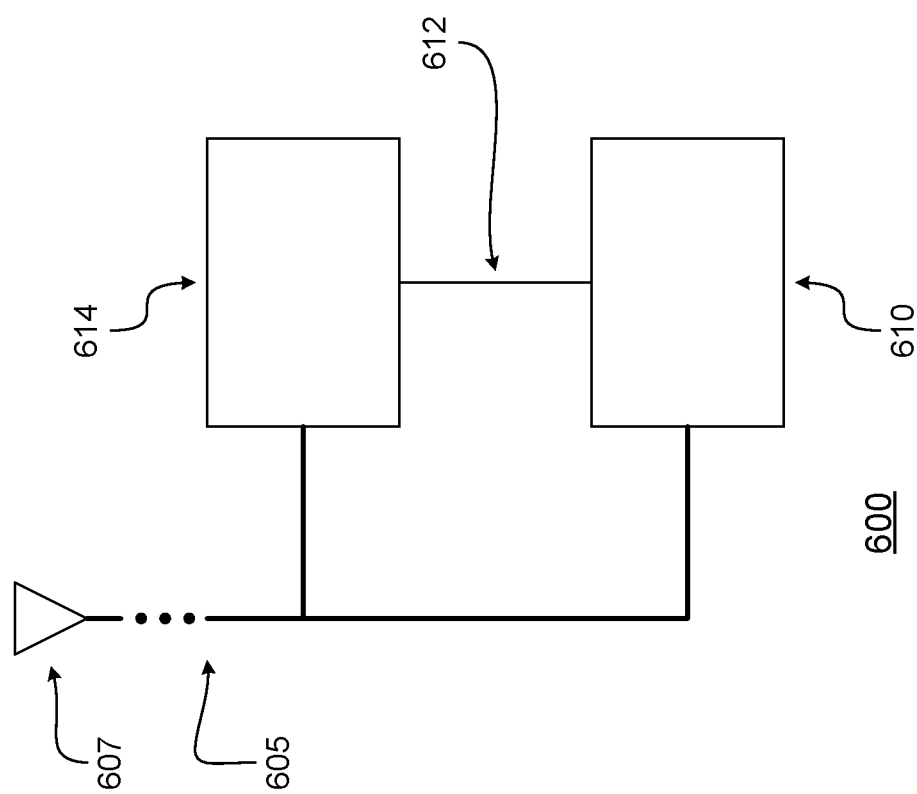
FIG. 6 illustrates hardware processing circuitries for a UE for supporting Bandwidth Parts (BWPs), in accordance with some embodiments of the disclosure.

FIG. 6 illustrates hardware processing circuitries for a UE for supporting BWPs, in accordance with some embodiments of the disclosure. With reference to FIG. 4, a UE may include various hardware processing circuitries discussed herein (such as hardware processing circuitry 600 of FIG. 6), which may in turn comprise logic devices and/or circuitry operable to perform various operations. For example, in FIG. 4, UE 430 (or various elements or components therein, such as hardware processing circuitry 440, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 436 (and/or one or more other processors which UE 430 may comprise), memory 438, and/or other elements or components of UE 430 (which may include hardware processing circuitry 440) may be arranged to perform the operations of these hardware processing circuitries, such as operations described herein with reference to devices and circuitry within these hardware processing circuitries. In some embodiments, processor 436 (and/or one or more other processors which UE 430 may comprise) may be a baseband processor.

Returning to FIG. 6, an apparatus of UE 430 (or another UE or mobile handset), which may be operable to communicate with one or more eNBs on a wireless network, may comprise hardware processing circuitry 600. In some embodiments, hardware processing circuitry 600 may comprise one or more antenna ports 605 operable to provide various transmissions over a wireless communication channel (such as wireless communication channel 450). Antenna ports 605 may be coupled to one or more antennas 607 (which may be antennas 425). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from a UE to a wireless communications channel and/or an eNB, and may be operable to provide signals from an eNB and/or a wireless communications channel to a UE. For example, antenna ports 605 and antennas 607 may be operable to provide transmissions from UE 430 to wireless communication channel 450 (and from there to eNB 410, or to another eNB). Similarly, antennas 607 and antenna ports 605 may be operable to provide transmissions from a wireless communication channel 450 (and beyond that, from eNB 410, or another eNB) to UE 430.

Hardware processing circuitry 600 may comprise various circuitries operable in accordance with the various embodiments discussed herein. With reference to FIG. 6, hardware processing circuitry 600 may comprise a first circuitry 610 and/or a second circuitry 620.

First circuitry 610 may be operable to process a first configuration transmission carrying an indicator of a BWP spanning at least part of a bandwidth of a wireless communication channel between the UE and the gNB. First circuitry 610 may also be operable to process a second configuration transmission carrying an indicator of an SRS) bandwidth for the BWP. Second circuitry 620 may be operable to generate an UL transmission for the BWP. Second circuitry 620 may also be operable to generate an SRS transmission based on the indicator of the SRS bandwidth. First circuitry 610 may be operable to provide an indicator of the BWP and/or an indicator of the SRS bandwidth to second circuitry 620 vi an interface 612. Hardware processing circuitry 600 may also comprise an interface for receiving configuration transmissions from a receiving circuitry and for sending UL transmissions to a transmission circuitry.

In some embodiments, the BWP may be a first BWP, and first circuitry 610 may also be operable to process another configuration transmission carrying an indicator of a second BWP spanning at least part of a bandwidth of the wireless communication channel. The UL transmission may be for one of: the first BWP, or the second BWP.

For some embodiments, first circuitry 610 may also be operable to process a DCI transmission carrying an active BWP indicator for establishing a configured BWP for the UL transmission.

In some embodiments, first circuitry 610 may also be operable to process a third configuration transmission carrying an indicator of one or more SRS configurations for the BWP.

For some embodiments, the SRS bandwidth may correspond with a bandwidth part of at least 120 PRBs. In some embodiments, the SRS bandwidth may be selected from a set of bandwidths comprising: 120 PRBs, 60 PRBs, 20 PRBs, or 4 PRBs. In some embodiments, the SRS bandwidth may be selected from a set of bandwidths comprising: 192 PRBs, 24 PRBs, 8 PRBs, or 4 PRBs.

In some embodiments, a total number of UE-specific SRS transmission symbols for a configured SRS resource may be accumulative across multiple slots on which the resource is configured.

In some embodiments, first circuitry 610 and/or second circuitry 620 may be implemented as separate circuitries. In other embodiments, first circuitry 610 and/or second circuitry 620 may be combined and implemented together in a circuitry without altering the essence of the embodiments.

Figure 7:
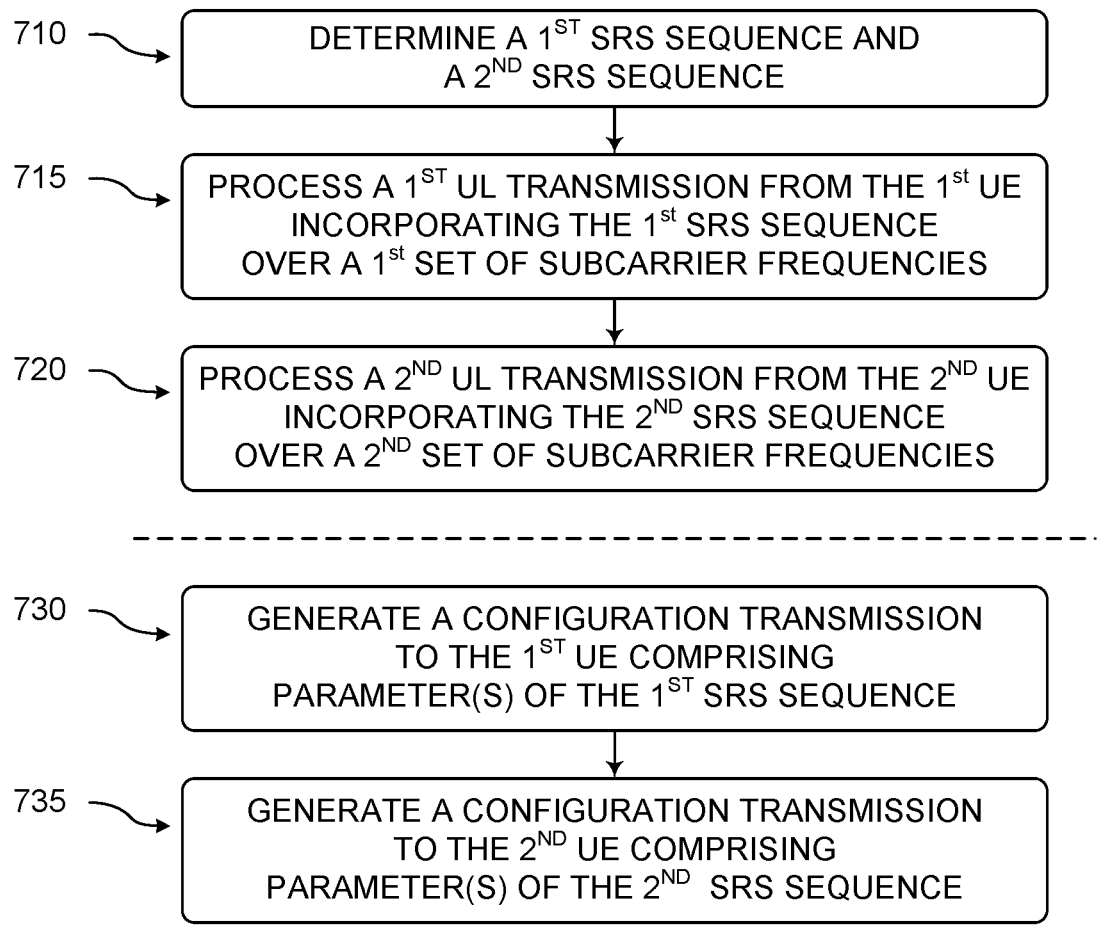
FIG. 7 illustrates methods for an eNB for flexible SRS sequence design, in accordance with some embodiments of the disclosure.

FIG. 7 illustrates methods for an eNB for flexible SRS sequence design, in accordance with some embodiments of the disclosure. With reference to FIG. 4, various methods that may relate to eNB 410 and hardware processing circuitry 420 are discussed herein. Although the actions in method 700 of FIG. 7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 410 and/or hardware processing circuitry 420 to perform an operation comprising the methods of FIG. 7. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 7.

Returning to FIG. 7, various methods may be in accordance with the various embodiments discussed herein. A method 700 may comprise a determining 710, a processing 715, and a processing 720. Method 700 may also comprise a generating 730 and/or a generating 735.

In determining 710, a first SRS sequence and a second SRS sequence may be determined. In processing 715, a first UL transmission from the first UE incorporating the first SRS sequence over a first set of subcarrier frequencies may be processed. In processing 720, a second UL transmission from the second UE incorporating the second SRS sequence over a second set of subcarrier frequencies may be processed. The second SRS sequence may comprise at least a first block that overlaps the first set of subcarrier frequencies and a second block that does not overlap the first set of subcarrier frequencies.

In some embodiments, the first SRS sequence and the second SRS sequence may be established based on the same ZC sequence. For some embodiments, the first SRS sequence and the first block of the second SRS sequence may be established based on a first ZC sequence, and the second block of the second SRS sequence may be established based on a second ZC sequence.

In generating 730, a configuration transmission to the first UE comprising one or more parameters of the first SRS sequence may be generated. In generating 735, a configuration transmission to the second UE comprising one or more parameters of the second SRS sequence may be generated.

In some embodiments, the first SRS sequence and the second SRS sequence may be received in the same OFDM symbol. For some embodiments, the first block of the second SRS sequence may have a relative phase rotation with respect to the second block of the second SRS sequence.

Figure 8:
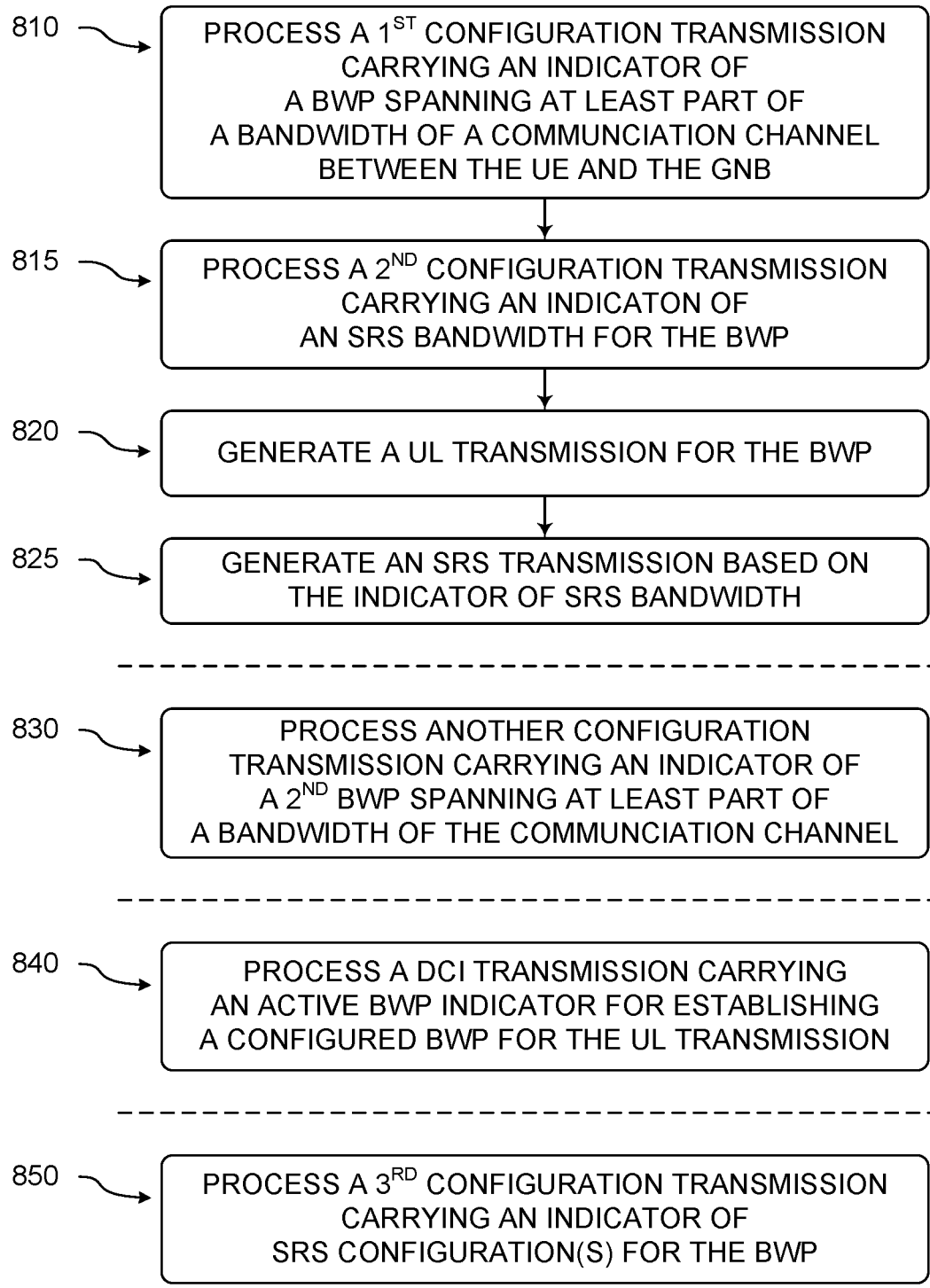
FIG. 8 illustrates methods for a UE for supporting BWPs, in accordance with some embodiments of the disclosure.

FIG. 8 illustrates methods for a UE for supporting BWPs, in accordance with some embodiments of the disclosure. With reference to FIG. 4, methods that may relate to UE 430 and hardware processing circuitry 440 are discussed herein. Although the actions in method 800 of FIG. 8 are shown in a particular order, the order of the actions can be modified. Thus, the illustrated embodiments can be performed in a different order, and some actions may be performed in parallel. Some of the actions and/or operations listed in FIG. 8 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8.

Returning to FIG. 8, various methods may be in accordance with the various embodiments discussed herein. A method 800 may comprise a processing 810, a processing 815, a generating 820, and a generating 825. Method 800 may also comprise a processing 830, a processing 940, and/or a processing 850.

In processing 810, a first configuration transmission carrying an indicator of a BWP spanning at least part of a bandwidth of a wireless communication channel between the UE and the gNB may be processed. In processing 815, a second configuration transmission carrying an indicator of an SRS bandwidth for the BWP may be processed. In generating 820, a UL transmission for the BWP may be generated. In generating 825, an SRS transmission based on the indicator of the SRS bandwidth may be generated.

In some embodiments, the BWP may be a first BWP, and in processing 830, another configuration transmission carrying an indicator of a second BWP spanning at least part of a bandwidth of the wireless communication channel may be generated. The UL transmission may be for one of: the first BWP, or the second BWP.

For some embodiments, in processing 840, a DCI transmission carrying an active BWP indicator for establishing a configured BWP for the UL transmission may be processed.

In some embodiments, in processing 850, a third configuration transmission carrying an indicator of one or more SRS configurations for the BWP may be processed.

For some embodiments, the SRS bandwidth may correspond with a bandwidth part of at least 120 PRBs. In some embodiments, the SRS bandwidth may be selected from a set of bandwidths comprising: 120 PRBs, 60 PRBs, 20 PRBs, or 4 PRBs. In some embodiments, the SRS bandwidth may be selected from a set of bandwidths comprising: 192 PRBs, 24 PRBs, 8 PRBs, or 4 PRBs.

In some embodiments, a total number of UE-specific SRS transmission symbols for a configured SRS resource may be accumulative across multiple slots on which the resource is configured.

Figure 9:
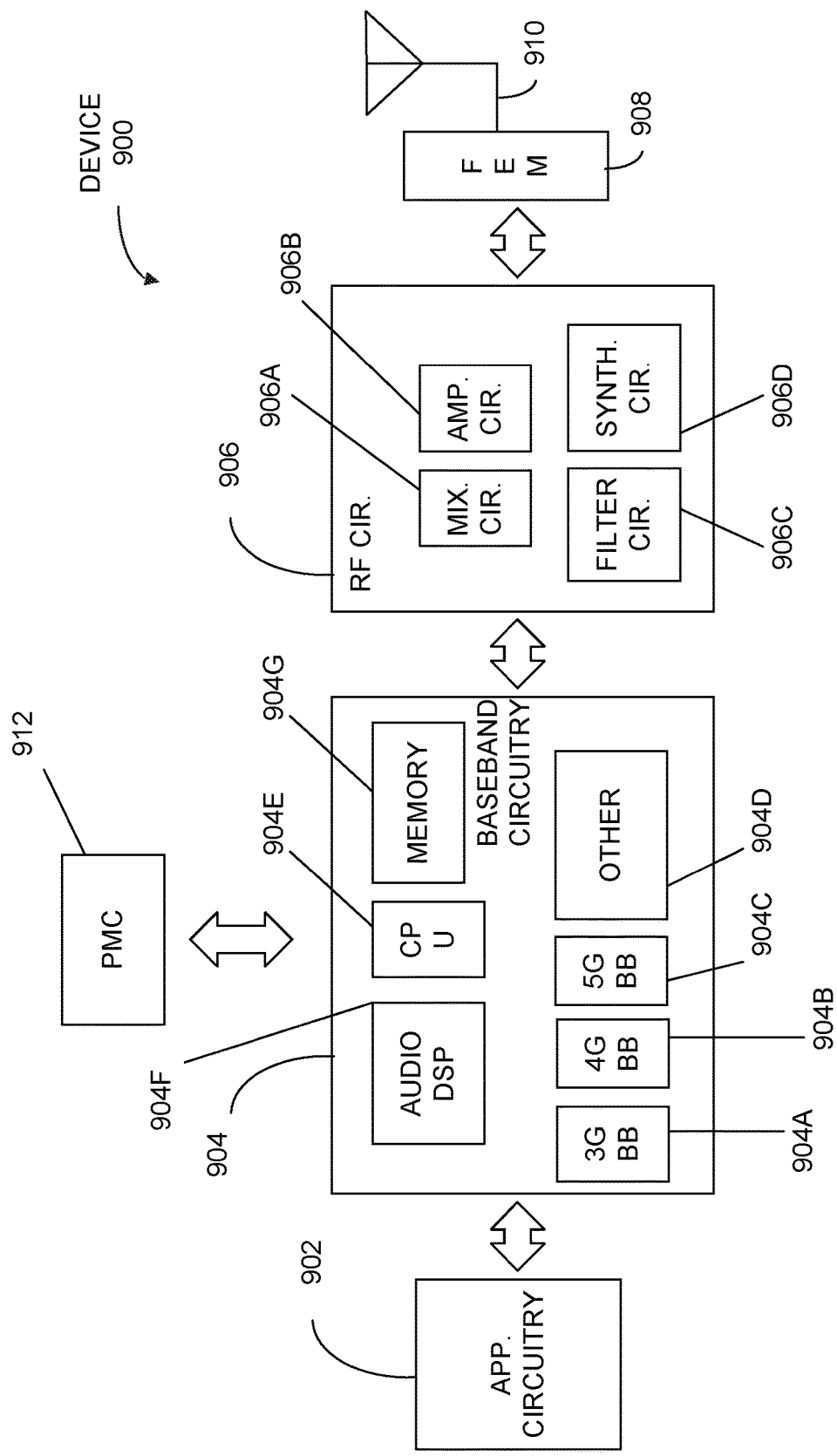
FIG. 9 illustrates example components of a device, in accordance with some embodiments of the disclosure.

FIG. 9 illustrates example components of a device, in accordance with some embodiments of the disclosure. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuity 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), and so on). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, and so on. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, and so on to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, and so on. The device 900 goes into a very low power state and it performs paging where again it periodically wakes up to listen to the network and then powers down again. The device 900 may not receive data in this state, in order to receive data, it must transition back to RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
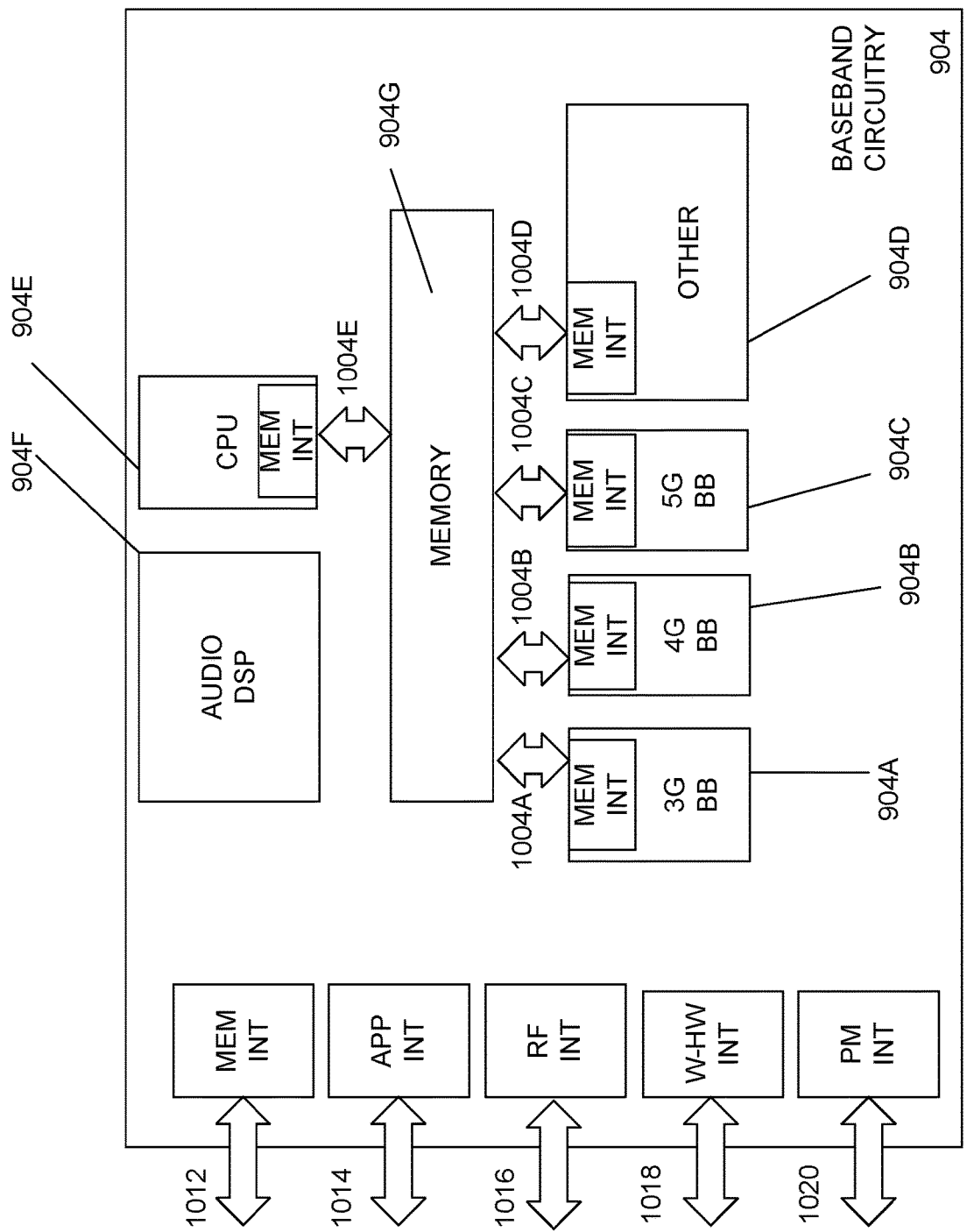
FIG. 10 illustrates example interfaces of baseband circuitry, in accordance with some embodiments of the disclosure.

FIG. 10 illustrates example interfaces of baseband circuitry, in accordance with some embodiments of the disclosure. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment any- where the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a fifth-generation Evolved Node B (gNB) operable to communicate with a first User Equipment (UE) and a second UE on a wireless network, comprising: one or more processors to: determine a first Sounding Reference Signal (SRS) sequence and a second SRS sequence; process a first Uplink (UL) transmission from the first UE incorporating the first SRS sequence over a first set of subcarrier frequencies; and process a second UL transmission from the second UE incorporating the second SRS sequence over a second set of subcarrier frequencies, wherein the second SRS sequence comprises at least a first block that overlaps the first set of subcarrier frequencies and a second block that does not overlap the first set of subcarrier frequencies, and an interface for sending the first transmission and the second transmission to a transmission circuitry.

In example 2, the apparatus of example 1, wherein the first SRS sequence and the second SRS sequence are established based on the same ZC sequence.

In example 3, the apparatus of example 1, wherein the first SRS sequence and the first block of the second SRS sequence are established based on a first ZC sequence; and wherein the second block of the second SRS sequence is established based on a second ZC sequence.

In example 4, the apparatus of any of examples 1 through 3, wherein the one or more processors are to: generate a configuration transmission to the first UE comprising one or more parameters of the first SRS sequence; and generate a configuration transmission to the second UE comprising one or more parameters of the second SRS sequence.

In example 5, the apparatus of any of examples 1 through 4, wherein the first SRS sequence and the second SRS sequence are received in the same Orthogonal Frequency Division Multiplexing (OFDM) symbol.

In example 6, the apparatus of any of examples 1 through 4, wherein the first block of the second SRS sequence has a relative phase rotation with respect to the second block of the second SRS sequence.

Example 7 provides an Evolved Node B (eNB) device comprising an application processor, a memory, one or more antenna ports, and an interface for allowing the application processor to communicate with another device, the eNB device including the apparatus of any of examples 1 through 6.

Example 8 provides machine readable storage media having machine executable instructions that, when executed, cause one or more processors of a fifth-generation Evolved Node B (gNB) operable to communicate with a first User Equipment (UE) and a second UE on a wireless network to perform an operation comprising: determine a first Sounding Reference Signal (SRS) sequence and a second SRS sequence; process a first Uplink (UL) transmission from the first UE incorporating the first SRS sequence over a first set of subcarrier frequencies; and process a second UL transmission from the second UE incorporating the second SRS sequence over a second set of subcarrier frequencies, wherein the second SRS sequence comprises at least a first block that overlaps the first set of subcarrier frequencies and a second block that does not overlap the first set of subcarrier frequencies.

In example 9, the machine readable storage media of example 8, wherein the first SRS sequence and the second SRS sequence are established based on the same ZC sequence.

In example 10, the machine readable storage media of example 8, wherein the first SRS sequence and the first block of the second SRS sequence are established based on a first ZC sequence; and wherein the second block of the second SRS sequence is established based on a second ZC sequence.

In example 11, the machine readable storage media of any of examples 8 through 10, the operation comprising: generate a configuration transmission to the first UE comprising one or more parameters of the first SRS sequence; and generate a configuration transmission to the second UE comprising one or more parameters of the second SRS sequence.

In example 12, the machine readable storage media of any of examples 8 through 11, wherein the first SRS sequence and the second SRS sequence are received in the same Orthogonal Frequency Division Multiplexing (OFDM) symbol.

In example 13, the machine readable storage media of any of examples 8 through 11, wherein the first block of the second SRS sequence has a relative phase rotation with respect to the second block of the second SRS sequence.

Example 14 provides an apparatus of a User Equipment (UE) operable to communicate with a fifth-generation Evolved Node B (gNB) on a wireless network, comprising: one or more processors to: process a first configuration transmission carrying an indicator of a Bandwidth Part (BWP) spanning at least part of a bandwidth of a wireless communication channel between the UE and the gNB; process a second configuration transmission carrying an indicator of a Sounding Reference Signal (SRS) bandwidth for the BWP; generate an Uplink (UL) transmission for the BWP; and generate an SRS transmission based on the indicator of the SRS bandwidth, and an interface for receiving configuration transmissions from a receiving circuitry and for sending UL transmissions to a transmission circuitry.

In example 15, the apparatus of example 14, wherein the BWP is a first BWP, and wherein the one or more processors are to: process another configuration transmission carrying an indicator of a second BWP spanning at least part of a bandwidth of the wireless communication channel; wherein the UL transmission is for one of: the first BWP, or the second BWP.

In example 16, the apparatus of example 15, wherein the one or more processors are to: process a Downlink Control Information (DCI) transmission carrying an active BWP indicator for establishing a configured BWP for the UL transmission.

In example 17, the apparatus of any of examples 14 through 15, wherein the one or more processors are to: process a third configuration transmission carrying an indicator of one or more SRS configurations for the BWP.

In example 18, the apparatus of any of examples 14 through 17, wherein the SRS bandwidth corresponds with a bandwidth part of at least 120 Physical Resource Blocks (PRBs).

In example 19, the apparatus of example 18, wherein the SRS bandwidth is selected from a set of bandwidths comprising: 120 PRBs, 60 PRBs, 20 PRBs, or 4 PRBs.

In example 20, the apparatus of example 18, wherein the SRS bandwidth is selected from a set of bandwidths comprising: 192 PRBs, 24 PRBs, 8 PRBs, or 4 PRBs.

In example 21, the apparatus of any of examples 14 through 20, wherein a total number of UE-specific SRS transmission symbols for a configured SRS resource are accumulative across multiple slots on which the resource is configured.

Example 22 provides a User Equipment (UE) device comprising an application processor, a memory, one or more antennas, a wireless interface for allowing the application processor to communicate with another device, and a touchscreen display, the UE device including the apparatus of any of examples 14 through 21.

Example 23 provides machine readable storage media having machine executable instructions that, when executed, cause one or more processors of a User Equipment (UE) operable to communicate with a fifth-generation Evolved Node B (gNB) on a wireless network to perform an operation comprising: process a first configuration transmission carrying an indicator of a Bandwidth Part (BWP) spanning at least part of a bandwidth of a wireless communication channel between the UE and the gNB; process a second configuration transmission carrying an indicator of a Sounding Reference Signal (SRS) bandwidth for the BWP; generate an Uplink (UL) transmission for the BWP; and generate an SRS transmission based on the indicator of the SRS bandwidth.

In example 24, the machine readable storage media of example 23, wherein the BWP is a first BWP, the operation comprising: process another configuration transmission carrying an indicator of a second BWP spanning at least part of a bandwidth of the wireless communication channel; wherein the UL transmission is for one of: the first BWP, or the second BWP.

In example 25, the machine readable storage media of example 24, the operation comprising: process a Downlink Control Information (DCI) transmission carrying an active BWP indicator for establishing a configured BWP for the UL transmission.

In example 26, the machine readable storage media of any of examples 23 through 24, the operation comprising: process a third configuration transmission carrying an indicator of one or more SRS configurations for the BWP.

In example 27, the machine readable storage media of any of examples 23 through 26, wherein the SRS bandwidth corresponds with a bandwidth part of at least 120 Physical Resource Blocks (PRBs).

In example 28, the machine readable storage media of any of example 27, wherein the SRS bandwidth is selected from a set of bandwidths comprising: 120 PRBs, 60 PRBs, 20 PRBs, or 4 PRBs.

In example 29, the machine readable storage media of any of example 27, wherein the SRS bandwidth is selected from a set of bandwidths comprising: 192 PRBs, 24 PRBs, 8 PRBs, or 4 PRBs.

In example 30, the machine readable storage media of any of examples 23 through 29, wherein a total number of UE-specific SRS transmission symbols for a configured SRS resource are accumulative across multiple slots on which the SRS resource is configured.

In example 31, the apparatus of any of examples 1 through 6, and 14 through 21, wherein the one or more processors comprise a baseband processor.

In example 32, the apparatus of any of examples 1 through 6, and 14 through 21, comprising a memory for storing instructions, the memory being coupled to the one or more processors.

In example 33, the apparatus of any of examples 1 through 6, and 14 through 21, comprising a transceiver circuitry for at least one of: generating transmissions, encoding transmissions, processing transmissions, or decoding transmissions.

In example 34, the apparatus of any of examples 1 through 6, and 14 through 21, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A base station (BS) operable to communicate with a first User Equipment (UE) and a second UE on a wireless network, comprising:
   one or more processors to:
      determine a first Sounding Reference Signal (SRS) sequence and a second SRS sequence;
      process a first Uplink (UL) transmission from the first UE incorporating the first SRS sequence over a first set of subcarrier frequencies; and
      process a second UL transmission from the second UE incorporating the second SRS sequence over a second set of subcarrier frequencies,
      wherein the second SRS sequence comprises at least a first set of physical resource blocks (PRBs) that overlaps the first set of subcarrier frequencies and a second set of PRBs that does not overlap the first set of subcarrier frequencies, and
   an interface for sending the first transmission and the second transmission to a transmission circuitry.

2. The BS of claim 1,
   wherein the first SRS sequence and the second SRS sequence are established based on a same Zadoff Chu (ZC) sequence.

3. The BS of claim 1,
   wherein the first SRS sequence and the first set of PRBs of the second SRS sequence are established based on a first Zadoff Chu (ZC) sequence; and
   wherein the second set of PRBs of the second SRS sequence is established based on a second ZC sequence.

4. The BS of claim 1, wherein the one or more processors are to:
   generate a configuration transmission to the first UE comprising one or more parameters of the first SRS sequence; and
   generate a configuration transmission to the second UE comprising one or more parameters of the second SRS sequence.

5. The BS of claim 1,
   wherein the first SRS sequence and the second SRS sequence are received in a same Orthogonal Frequency Division Multiplexing (OFDM) symbol.

6. The BS of claim 1,
   wherein the first set of PRBs of the second SRS sequence has a relative phase rotation with respect to the second set of PRBs of the second SRS sequence.

7. Machine readable storage media having machine executable instructions that, when executed, cause one or more processors of a base station (BS) operable to communicate with a first User Equipment (UE) and a second UE on a wireless network to perform operations comprising:
   determining a first Sounding Reference Signal (SRS) sequence and a second SRS sequence;
   processing a first Uplink (UL) transmission from the first UE incorporating the first SRS sequence over a first set of subcarrier frequencies; and
   processing a second UL transmission from the second UE incorporating the second SRS sequence over a second set of subcarrier frequencies,
   wherein the second SRS sequence comprises at least a first set of physical resource blocks (PRBs) that overlaps the first set of subcarrier frequencies and a second set of PRBs that does not overlap the first set of subcarrier frequencies.

8. The machine readable storage media of claim 7,
   wherein the first SRS sequence and the second SRS sequence are established based on a same Zadoff Chu (ZC) sequence.

9. The machine readable storage media of claim 7,
   wherein the first SRS sequence and the first set of PRBs of the second SRS sequence are established based on a first Zadoff Chu (ZC) sequence; and
   wherein the second set of PRBs of the second SRS sequence is established based on a second ZC sequence.

10. The machine readable storage media of claim 7, the operations further comprising:
   generating a configuration transmission to the first UE comprising one or more parameters of the first SRS sequence; and
   generating a configuration transmission to the second UE comprising one or more parameters of the second SRS sequence.

11. The machine readable storage media of claim 7,
   wherein the first SRS sequence and the second SRS sequence are received in a same Orthogonal Frequency Division Multiplexing (OFDM) symbol.

12. The machine readable storage media of claim 7,
   wherein the first set of PRBs of the second SRS sequence has a relative phase rotation with respect to the second set of PRBs of the second SRS sequence.

13. A User Equipment (UE) operable to communicate with a base station (BS) on a wireless network, comprising:
one or more processors to:
process a first configuration transmission carrying an indicator of a Bandwidth Part (BWP) spanning at least part of a bandwidth of a wireless communication channel between the UE and the BS;
process a second configuration transmission carrying an indicator of a Sounding Reference Signal (SRS) bandwidth for the BWP;
generate an Uplink (UL) transmission for the BWP; and
generate an SRS transmission based on the indicator of the SRS bandwidth, and
an interface for receiving configuration transmissions from a receiving circuitry and for sending UL transmissions to a transmission circuitry.

14. The UE of claim 13, wherein the BWP is a first BWP, and wherein the one or more processors are to:
process another configuration transmission carrying an indicator of a second BWP spanning at least part of a bandwidth of the wireless communication channel;
wherein the UL transmission is for one of: the first BWP or the second BWP.

15. The UE of claim 14, wherein the one or more processors are to:
process a Downlink Control Information (DCI) transmission carrying an active BWP indicator for establishing a configured BWP for the UL transmission.

16. The UE of claim 13, wherein the one or more processors are to:
process a third configuration transmission carrying an indicator of one or more SRS configurations for the BWP.

17. The UE of claim 13,
wherein the SRS bandwidth corresponds with a bandwidth part of at least 120 Physical Resource Blocks (PRBs).

18. The UE of claim 13,
wherein a total number of UE-specific SRS transmission symbols for a configured SRS resource are accumulative across multiple slots on which the resource is configured.

19. Machine readable storage media having machine executable instructions that, when executed, cause one or more processors of a User Equipment (UE) operable to communicate with a base station (BS) on a wireless network to perform operations comprising:
processing a first configuration transmission carrying an indicator of a Bandwidth Part (BWP) spanning at least part of a bandwidth of a wireless communication channel between the UE and the BS;
processing a second configuration transmission carrying an indicator of a Sounding Reference Signal (SRS) bandwidth for the BWP;
generating an Uplink (UL) transmission for the BWP; and
generating an SRS transmission based on the indicator of the SRS bandwidth.

20. The machine readable storage media of claim 19, wherein the BWP is a first BWP, the operations further comprising:
processing another configuration transmission carrying an indicator of a second BWP spanning at least part of a bandwidth of the wireless communication channel;
wherein the UL transmission is for one of: the first BWP or the second BWP.

21. The machine readable storage media of claim 20, the operations further comprising:
processing a Downlink Control Information (DCI) transmission carrying an active BWP indicator for establishing a configured BWP for the UL transmission.

22. The machine readable storage media of claim 19, the operations further comprising:
processing a third configuration transmission carrying an indicator of one or more SRS configurations for the BWP.

23. The machine readable storage media of claim 19,
wherein the SRS bandwidth corresponds with a bandwidth part of at least 120 Physical Resource Blocks (PRBs).

24. The machine readable storage media of claim 19,
wherein a total number of UE-specific SRS transmission symbols for a configured SRS resource are accumulative across multiple slots on which the SRS resource is configured.

* * * * *